United States Patent
Fluman et al.

(10) Patent No.: US 9,612,747 B2
(45) Date of Patent: *Apr. 4, 2017

(54) PERFORMANCE-BASED GROUPING OF STORAGE DEVICES IN A STORAGE SYSTEM

(71) Applicant: International Business Machines Corporation, Armonk, NY (US)

(72) Inventors: Mudi M. Fluman, Haifa (IL); Yaacov Frank, Ramot Meir (IL); Yehuda Shiran, Haifa (IL); Ronny Vatelmacher, Hod-Hashron (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/188,207

(22) Filed: Jun. 21, 2016

(65) Prior Publication Data

US 2016/0291875 A1    Oct. 6, 2016

Related U.S. Application Data

(63) Continuation of application No. 15/054,249, filed on Feb. 26, 2016, now Pat. No. 9,389,810, which is a
(Continued)

(51) Int. Cl.
    *G06F 13/00* (2006.01)
    *G06F 3/06* (2006.01)
    (Continued)

(52) U.S. Cl.
    CPC ............ *G06F 3/0605* (2013.01); *G06F 3/061* (2013.01); *G06F 3/065* (2013.01); *G06F 3/067* (2013.01);
    (Continued)

(58) Field of Classification Search
    None
    See application file for complete search history.

(56) References Cited

U.S. PATENT DOCUMENTS 6,633,955 B1    10/2003   Yin et al.
7,073,029 B2    7/2006    Uysal et al.
(Continued)

FOREIGN PATENT DOCUMENTS

EP    1191431 A2    3/2002

OTHER PUBLICATIONS

Wu, Shang-Chen, et al.; "Multi-rate Digital Control with Interlacing and Its Application to Hard Disk Drive Servo"; Berkeley; USA; Copyright 2003 IEEE.
(Continued)

*Primary Examiner* — Midys Rojas
*Assistant Examiner* — Stephanie Wu
(74) *Attorney, Agent, or Firm* — Walter L. Rudberg; Edward J. Wixted, III

(57) ABSTRACT

A computer determines an intrinsic read speed and an intrinsic write speed associated with a first disk and a second disk. The computer receives a request to read a portion of data, wherein the portion of data is stored redundantly on both the first and second disk. The computer identifies a first latency associated with reading the portion of data from the first disk, where the first latency is based on at least the intrinsic read speed and the intrinsic write speed associated with the first disk. The computer identifies a second latency associated with reading the portion of data form the second disk, wherein the second latency is based on at least the intrinsic read speed and the intrinsic write speed associated with the second disk. The computer determines that the first latency exceeds the second latency. The computer selects the second disk to read the portion of data.

1 Claim, 5 Drawing Sheets

Related U.S. Application Data continuation of application No. 14/547,366, filed on Nov. 19, 2014.

(51) Int. Cl.
*G06F 11/14* (2006.01)
*G06F 13/16* (2006.01)

(52) U.S. Cl.
CPC .......... *G06F 3/0611* (2013.01); *G06F 3/0644* (2013.01); *G06F 3/0659* (2013.01); *G06F 3/0689* (2013.01); *G06F 11/1456* (2013.01); *G06F 13/161* (2013.01)

(56) References Cited

U.S. PATENT DOCUMENTS

| | | | |
|---|---|---|---|
| 7,525,307 B2 | 4/2009 | Shen | |
| 9,389,810 B2 | 7/2016 | Fluman et al. | |
| 2004/0093442 A1 | 5/2004 | Furuya | |
| 2005/0025011 A1* | 2/2005 | Gabryjelski | G11B 20/10527 369/47.33 |
| 2007/0192538 A1* | 8/2007 | Dawkins | G06F 11/3442 711/114 |
| 2010/0064094 A1* | 3/2010 | Yeh | G06F 12/0246 711/103 |
| 2010/0100678 A1 | 4/2010 | Kobayashi | |
| 2013/0151892 A1 | 6/2013 | Huang et al. | |
| 2014/0082229 A1 | 3/2014 | Serizawa et al. | |
| 2014/0082318 A1 | 3/2014 | Benhase et al. | |
| 2014/0101373 A1* | 4/2014 | Lee | G06F 3/0655 711/103 |
| 2014/0108759 A1 | 4/2014 | Iwamitsu et al. | |
| 2014/0122815 A1* | 5/2014 | Iwakoshi | G06F 13/1626 711/158 |
| 2014/0258612 A1 | 9/2014 | Kalwitz et al. | |
| 2015/0046668 A1 | 2/2015 | Hyde, II et al. | |
| 2016/0139820 A1 | 5/2016 | Fluman et al. | |

OTHER PUBLICATIONS

List of IBM Patents or Patent Applications Treated As Related; Filed Sep. 6, 2016; 2 pages.

* cited by examiner

PERFORMANCE-BASED GROUPING OF STORAGE DEVICES IN A STORAGE SYSTEM

BACKGROUND OF THE INVENTION

The present invention relates generally to the field of storage device management and more particularly to primary disk selection for a data transfer.

When applications require large amounts of storage, many hard drives or other data storage device re combined together, for example, disk arrays or redundant arrays of independent disks (RAID) arrays. The use of multiple storage devices combined together can yield increased storage capacity, greater performance, or greater reliability. In applications where data must be read quickly, information can be split between multiple storage devices which read and write portions of the data simultaneously for increased performance. In applications where security is important, data can be stored redundantly on multiple storage devices for protection in the event that one or more copies of the information are destroyed, corrupted, or lost.

Most common enterprise storage systems automatically make two or more copies of data for reliability purposes. Traditionally, one copy of the data serves as the primary copy while other copies serves as secondary copies of the data. Primary copies are traditionally accessed for read operations while secondary copies serve as a backup of the primary copies and are traditionally accessed only in the case of a primary copy failing.

SUMMARY

Embodiments of the present invention disclose a method, computer program product, and computer system for selecting a disk in a multi-disk storage system to perform an operation. A computer determines an intrinsic read speed and an intrinsic write speed associated with a first disk and a second disk. The computer receives a request to read a portion of data, where the portion of data is stored redundantly on both the first disk and the second disk. The computer identifies a first latency associated with reading the portion of data from the first disk, where the first latency is based on at least the intrinsic read speed and the intrinsic write speed associated with the first disk. The computer identifies a second latency associated with reading the portion of data form the second disk, wherein the second latency is based on at least the intrinsic read speed and the intrinsic write speed associated with the second disk. The computer determines that the first latency exceeds the second latency. The computer selects the second disk to read the portion of data.

DETAILED DESCRIPTION

Figure 1:
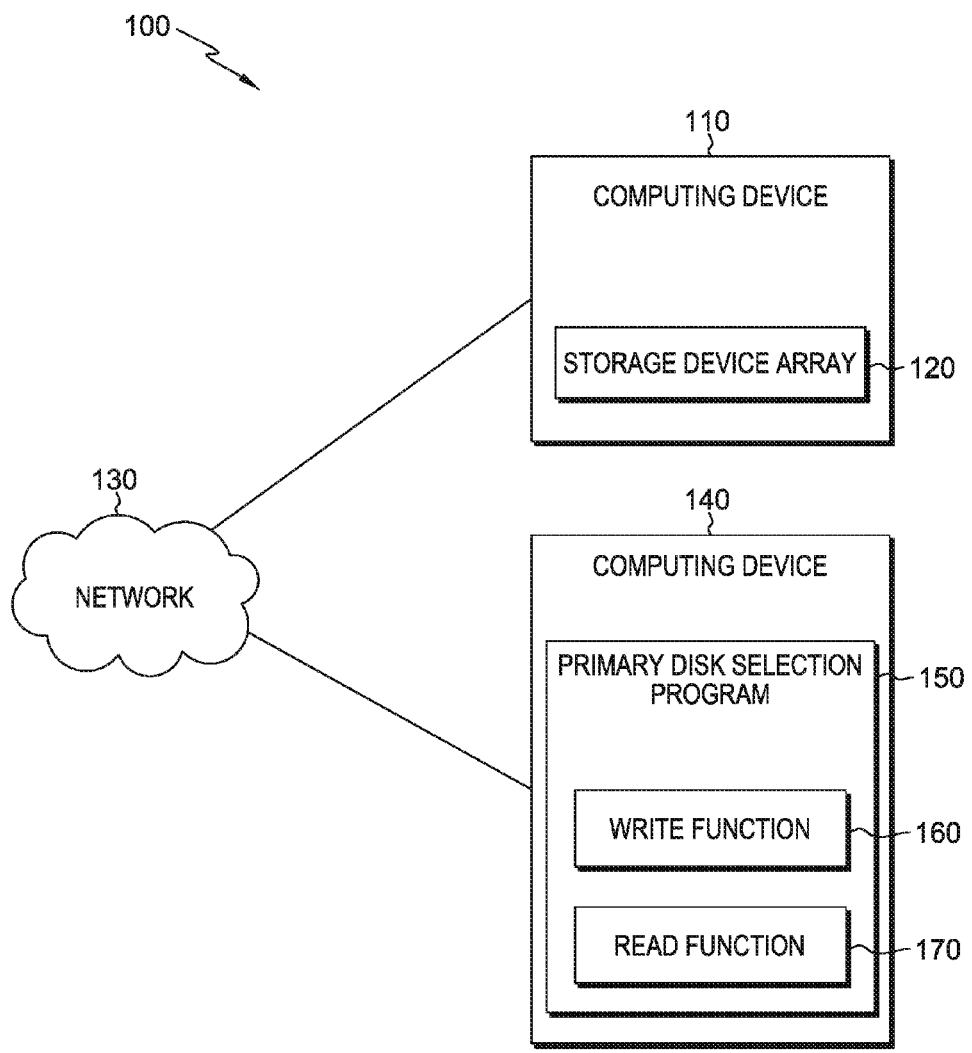
FIG. 1 is a functional block diagram illustrating a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention.

Distributed data processing environment 100 includes computing device 110 and computing device 140, all interconnected over network 130.

Computing devices 110 and 140 may be laptop computers, tablet computers, netbook computers, personal computers (PCs), desktop computers, personal digital assistants (PDAs), smart phones, or any programmable electronic devices capable of communicating with computing devices 110 and 140 via network 130. Computing device 110 includes storage device array 120, the components of which are described in greater detail with respect to FIG. 4. Computing device 140 includes primary disk selection program 150 which selects a primary disk from a pair of storage disks for a read or write operation. Primary disk selection program 150 includes write function 160 and read function 170 which handle the selection of a primary disk for a write or read operation respectively.

Storage device array 120 is an array or grouping of one or more storage devices such as hard disk drives (HDDs), solid state drives (SSDs), flash memory, or any other devices capable of storing computer-readable program instructions or data configured to operate as a single pool of seamless resources. Storage device array 120 can be a redundant array of independent disks (RAID) or any other type of array of storage devices configured to store data across one or more storage devices in a scheme such as RAID 0, RAID 1, RAID 5, or any other configuration for storing data across multiple storage devices. In the depicted embodiment, storage device array 120 is an array of six storage devices where three disks grouped into a "slow disk array" mirror the data of three disks grouped into a "fast disk array", as described in greater detail with respect to FIG. 4. In other embodiments, storage device array 120 can contain any number of storage devices as long as there is at least one storage device present in both the "slow disk array" and "fast disk array". In general, a "fast disk array" and a "slow disk array" are created such that the faster 50% of disks, based on intrinsic performance measurements, are grouped into the "fast disk array" while the remaining slower disks are grouped into the "slow disk array"

Primary disk selection program 150 is a program which selects a disk from a pair of disks included in storage device array 120 to be used as a primary disk for a read or write operation. Primary disk selection program 150 includes write function 160 and read function 170 which handle the selection of a primary disk for write operations and read operations respectively. In the depicted embodiment, primary disk selection program 150 includes a separate function for selecting a primary disk for a read or write operation.

In other embodiments, the invention can incorporate two separate primary disk selection programs for selecting a primary disk for a read or write operation.

Network 130 can be, for example, a local area network (LAN), a wide area network (WAN) such as the Internet, or a combination of the two, and can include wired, wireless, or fiber optic connections. In general, network 130 can be any combination of connections and protocols that will support communications between computing device 110 and computing device 140.

Figure 5:
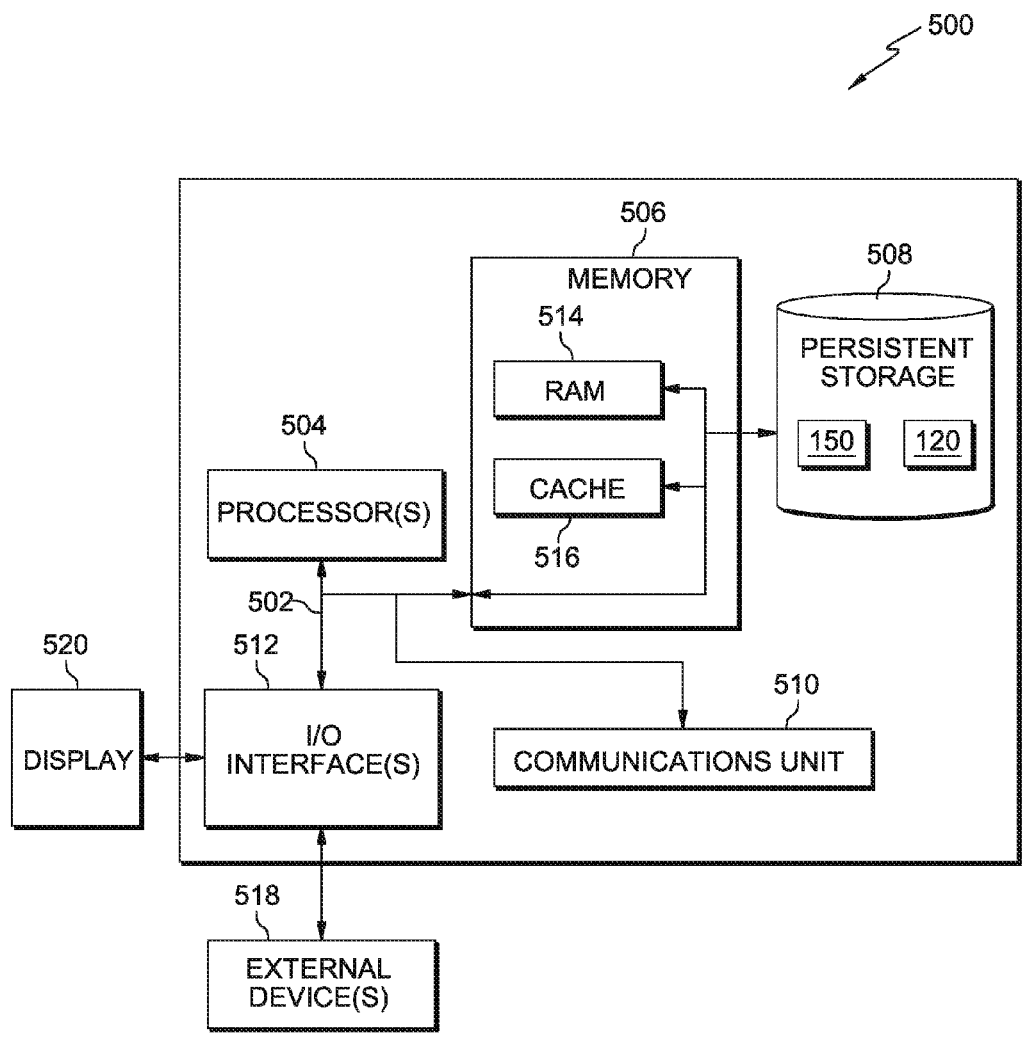
FIG. 5 is a block diagram of components of the computing device executing the primary disk selection program, in accordance with an embodiment of the present invention.

Computing devices 110 and 140 may include internal and external hardware components, as depicted and described in further detail with respect to FIG. 5.

Figure 2:
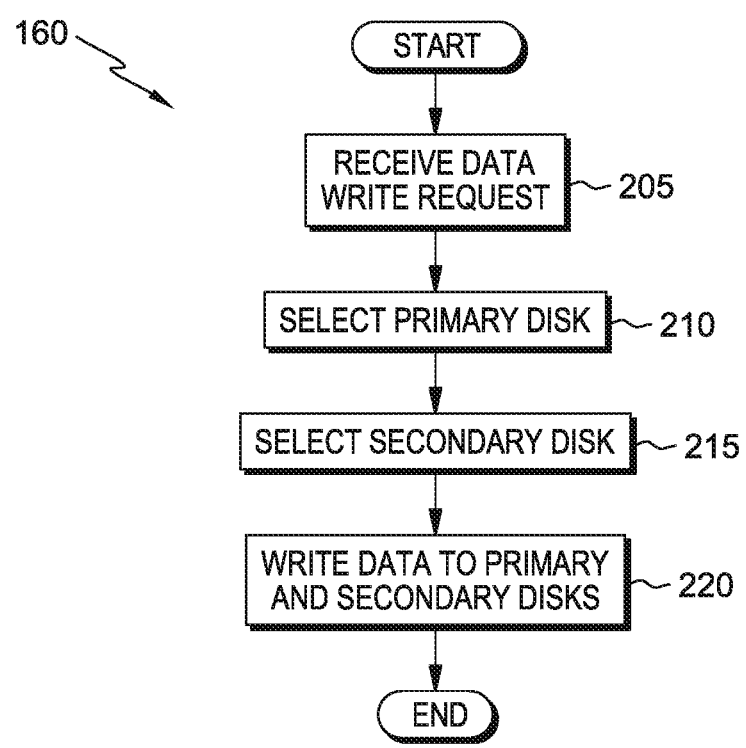
FIG. 2 is a flowchart depicting operational steps of a write function of a primary disk selection program, on a computing device within the data processing environment of FIG. 1, for selecting a primary and secondary disk to write a portion of data to, in accordance with an embodiment of the present invention.
Figure 3:
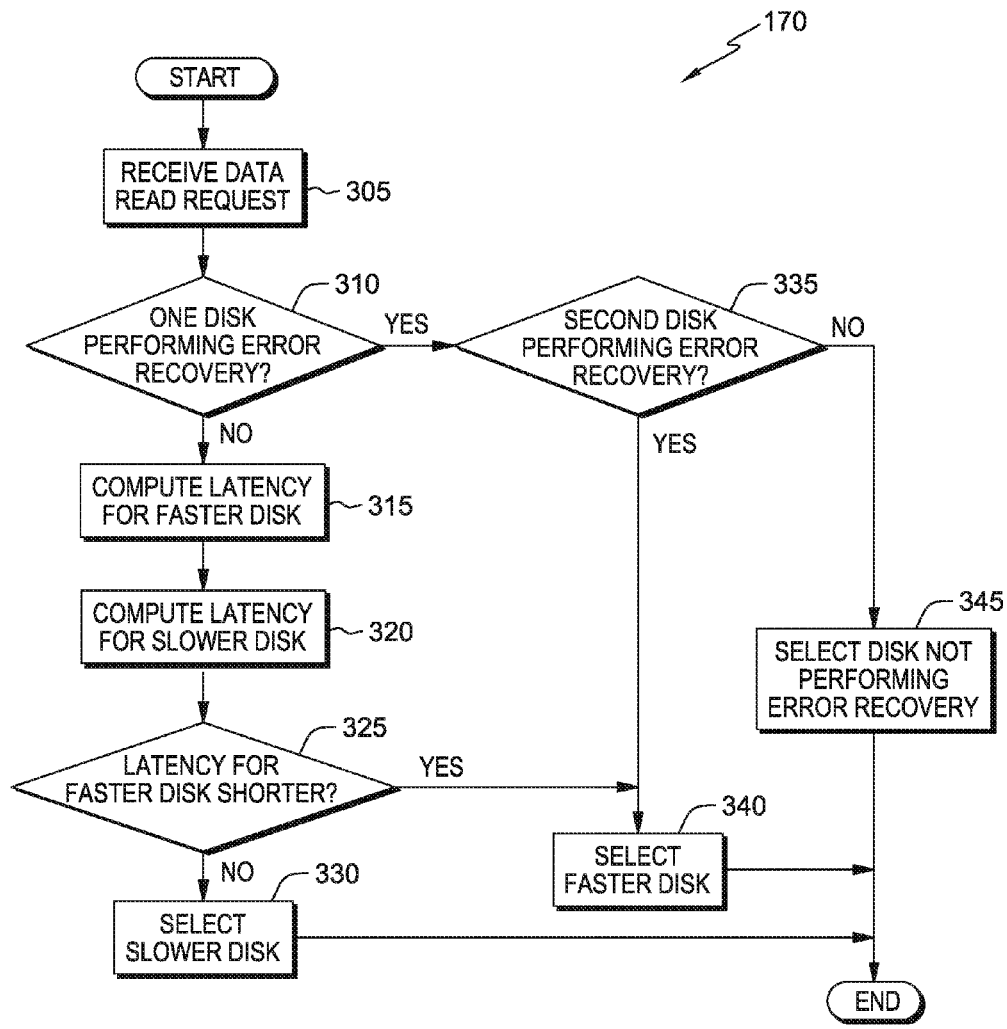
FIG. 3 is a flowchart depicting operational steps of a read function of a primary disk selection program, on a computing device within the data processing environment of FIG. 1, for selecting a primary and secondary disk to read a portion of data from, in accordance with an embodiment of the present invention.

FIGS. 2 and 3 are flowcharts depicting operational steps of write function 160 and read function 170 within primary disk selection program 150 for selecting a primary disk to perform a write or read operation, in accordance with an embodiment of the present invention. Primary disk selection program 150 uses a combination of intrinsic properties such as I/O speed or type of device and runtime information such as the current queue of read or write operations or whether a disk is currently in error recovery mode to select a primary disk for a read or write operation.

FIG. 2 is a flowchart depicting the operational steps of write function 160 within primary disk selection program 150. Write function 160 selects a pair of disks to be used as a primary and secondary disk to store data which is to be written to storage device array 120. A primary disk is selected from an array of "fast disks" such as fast disk array 410 within storage device array 120 and a secondary disk is selected from an array of "slow disks" such as slow disk array 420 within storage device array 120. Additionally, write function 160 writes the received data request redundantly to both the primary disk and the secondary disk.

In step 205, write function 160 of primary disk selection program 150 receives a request for writing a portion of data to storage device array 120. In some embodiments, the request for writing a portion of data includes only the portion of data which is to be written to storage device array 120 and an indication that the data is to be written. In this embodiment, write function 160 assumes that all data write requests received in step 205 are to be written redundantly to two disks within storage device array 120.

Write function 160 selects a primary disk in step 210. In the depicted embodiment, primary disks are selected sequentially from fast disk array 410 (see FIG. 4) and are changed for each write operation processed by write function 160. For example, in the depicted embodiment, fast disk array 410 includes three disks, disk 412, 414, and 416 (see FIG. 4). For each write operation received by write function 160, one of the three disks included in fast disk array 410 is selected to be used as the primary disk for that write operation. In the depicted embodiment, the first write operation received by write function 160 uses disk 412 as a primary disk while the second write operation received by write function 160 uses disk 414 as a primary disk. Further, the third write operation received by write function 160 uses disk 416 as a primary disk, while the fourth write operation received by write function 160 will again use disk 412 as a primary disk. In other embodiments a primary disk is selected randomly from the disks included in fast disk array 410. In embodiments where a subset of the disks included in fast disk array are extremely heavily loaded, a primary disk is selected either randomly or sequentially from the disks which are not performing a read or write operation at the time of the selection of the primary disk.

Write function 160 selects a secondary disk in step 215. In the depicted embodiment, secondary disks are selected randomly from an array of slow disks such as slow disk array 420. In embodiments such as the depicted embodiment, the selection of a secondary disk for a given write operation is unrelated to the selection of a secondary disk for a previous write operation. In such embodiments, selection of a secondary disk for a write operation is made randomly using, for example, a random number generator or a predetermined list of randomly generated values. In embodiments where the selection of a primary disk is made randomly, the secondary disk can be selected either sequentially or randomly from the set of disks included in slow disk array 420.

In step 220, write function 160 writes the data received in step 205 redundantly to the primary and secondary disks selected in steps 210 and 215.

FIG. 3 is a flowchart depicting the operational steps of read function 170 of primary disk selection program 150. Read function 170 handles selecting a disk from a pair of disks in storage device array 120 to serve as a primary disk for a read operation. In various embodiments, a pair of disks includes one disk in fast disk array 410, herein referred to as a faster disk and one disk in slow disk array 420, herein referred to as a slower disk. In general, read function 170 selects a primary disk in order to minimize the latency due to error recovery and queued read and write tasks expected before a read operation can begin. A primary disk for a read operation designates the disk from which the data is read. A secondary disk for a read operation acts as a temporary backup copy of the data stored on the primary disk.

In step 305, write function 170 receives a request to read a portion of data stored redundantly on a pair of disks within storage device array 120. In the present embodiment, a request to read a portion of data includes an identification of the portion of data to be read, and the two disks within storage device array 120 on which the portion of data is stored redundantly. In other embodiments, a request to read a portion of data may only identify the portion of data to be read, and the disks on which that information is stored must be determined based on information stored in a table, such as a file allocation table. It should be appreciated by one skilled in the art that in various embodiments of the invention the method for determining the disks on which a portion of data is stored varies depending on the type of file system used, the operating system used, and the configuration of storage device array 120. Many methods for determining the location of a portion of data on a disk or array of disks are well known in the art and various methods may be used by different embodiments of the invention.

In decision step 310, read function 170 determines if at least one of the two disks containing the portion of data to be read is currently performing an error recovery operation. If one or both of the disks is currently performing an error recovery operation (decision step 310, yes branch), then read function 170 proceeds to determine if both disks are currently performing error recovery operations in decision step 335. If neither of the disks on which the portion of data to be read is stored are currently performing error recovery operations (decision step 310, no branch), read function 170 computes the expected latency for using the faster disk to perform the write operation in step 315.

In step 315, read function 170 computes the expected latency for reading the data specified by the data read request received in step 305 from the disk contained in fast disk array 410. In various embodiments, read function 170 computes the expected latency for the faster disk by using an equation such as the following:

$$(QR_F * R_F) + (QW_F * W_F) \qquad (1)$$

In equation (1), the first portion of the equation ($QR_F * R_F$) represents the expected amount of time required to perform all read operations present in the queue of read operations to be performed by the faster disk of the pair of disks before the read operation received in step 305 can be performed. The term $QR_F$ represents the total number of data blocks included in all the queued read operations to be performed by the faster disk. In various embodiments, data stored on the disks within storage device array 120 is divided into blocks of varying size such as 4 KB, 8 KB, 16 KB, 32 KB, or any other amount of data. For example, in an embodiment where data is divided into blocks of 4 KB, the read operations in the queue for the faster disk include one operation to read a 10 MB file comprising 2,500 4 KB blocks, one operation to read a 57 MB file comprising 14,250 4 KB blocks, and one operation to read a 3.1 MB file comprising 775 4 KB blocks. In this embodiment the total value of the read operations in the queue ($QR_F$) would be 70.1 MB or 17,525 4 KB blocks. The term $R_F$ represents the expected amount of time that the faster disk takes to read a 4 KB block of data. In one embodiment, the time required to read one 4 KB block of data is determined to be 0.0002 seconds for the faster disk. The total expected amount of time required to perform all of the read operations in the queue for the faster disk is computed by multiplying the total amount of data blocks included in those read operations by the expected amount of time needed to read each block of data ($QR_F * R_F$). In one embodiment where the queue of read operations includes 17,525 4 KB blocks of data and the time required to read one 4 KB block of data is 0.0002 seconds, the expected amount of time required to perform all the read operations in the queue is estimated to be (17525*0.0002), or 3.505 seconds. The process of determining the expected amount of time needed to read each block of data for a given disk is described in further detail with respect to FIG. 4.

In the depicted embodiment, the expected amount of time required to execute each of the read and write operations in the queue of read and write operations is determined based on the number of data blocks in each queue, and the expected time required to read or write a block of data from or to a disk. In other embodiments, the expected amount of time required to execute each of the read and write operations in the queue of read and write operations is determined by dividing the total amount of data present in a disks read or write queue by the intrinsic read or write speed for that disk. For example, in an embodiment where a queue of read operations for a disk contains three read operations totaling 135.7 MB and the disk has an intrinsic read speed of 20 MB per second, the total expected amount of time required to perform all the read operations present in the queue of read operations for that disk would be estimated to be 6.785 seconds.

The second portion of equation (1), similarly to the first portion, represents the expected amount of time required to perform all write operations present in the queue of write operations for the faster disk on which the data to be read is stored. The total amount of time required to perform all write operations present in the queue is calculated by multiplying the total number of blocks of data to be written in the write operations in the queue ($QW_F$) by the expected amount of time required to write each block of data to the disk ($W_F$). Once the expected amount of time required to perform each of the operations in the queue of read operations ($QR_F * R_F$) and the amount of time required to perform each of the operations in the queue of write operations ($QW_F * W_F$) is determined, both are added together to determine the total amount of expected time required to perform all read and write operations present in the queue for the disk (($QR_F * R_F$)+($QW_F * W_F$)).

The total time to complete the operations in the read and write queues must be computed separately because in various embodiments the intrinsic read and write speeds for a given disk are different and the expected amount of time required to read a block of data differs from the expected amount of time required to write a block of data to the disk. These different speeds must be used only for the read or write operations to which they apply, as using a single value for both read and write operations would provide an invalid estimate of the expected amount of time required to process a read or write operation of a block. It is assumed that a disk within storage device array 120 can only perform one operation at a time, and must perform all data read and write requests in the order in which they arrive, regardless of whether the request is a read request or a write request. Additionally, it is assumed that all of the operations present in the queue for read and write operations must be performed before execution of a new read request can occur, such as the data read request received in step 305.

In step 320, read function 170 computes the expected latency for reading the data specified by the data read request in step 305 from the disk containing the data to be read contained in slow disk array 420. In various embodiments, computing the expected latency for the slower disk is done using an equation such as the following:

$$(QR_S * R_S) + (QW_S * W_S) \qquad (2)$$

Similarly to equation (1), equation (2) represents the total expected amount of time required to complete all read and write operations currently in the queue for the slower disk. Each of the terms in equation (2) have a meaning similar to the corresponding term in equation (1), but applied to the slower disk in the pair as opposed to the faster disk in the pair. For example, the term $QR_S$ represents the total amount of data included in all the queued read operations to be performed by the slower disk while the term $W_S$ represents the intrinsic write speed of the slower disk. The first portion of equation (2), ($QR_S * R_S$) represents the expected amount of time required to perform all of the read operations present in the queue of read operations for a disk present in slow disk array 420. Similarly, the second portion ($QW_S * W_S$) represents the expected amount of time required to perform all of the write operations present in the queue of write operations for a disk present in slow disk array 420.

In decision step 325, read function 170 compares the expected latency for the faster disk computed in step 315 to the expected latency for the slower disk computed in step 320 to determine which disk has a lower expected latency. If the expected latency for the faster disk computed in step 315 is shorter than the expected latency for the slower disk computed in step 320 (decision step 325, yes branch), then read function 170 selects the faster disk in step 340. If the expected latency for the slower disk computed in step 320 is shorter than the expected latency for the faster disk computed in step 315 (decision step 325, no branch), then read function 170 selects the slower disk to perform the read operation received in step 305 in step 330. In cases where the expected latency for reading a portion of data from each disk in the pair of disks is exactly the same, either the faster disk or the slower disk is selected in various embodiments based on a preference selected by a user for which disk to select in the event of a the expected latency being determined to be the same.

In cases where one disk is performing error recovery (decision step 310, yes branch), read function 170 proceeds to determine if the second disk in the pair of disks is performing error recovery in decision step 335. For example, if read function 170 determines that for a pair of disks, the disk in fast disk array 410 is performing error recovery, then read function 170 determines if the disk in slow disk array 420 is performing error recovery in step 335.

If both disks are performing error recovery (decision step 335, yes branch), then read function 170 selects the faster disk of the pair of disks in step 340. It is assumed that due to the intrinsic advantage in speed that the faster disk has over the slower disk, the faster disk will complete error recovery faster on average than the slower disk. If the second disk is not performing error recovery (decision step 335, no branch), then read function 170 selects the disk not performing error recovery in step 345. For example, if the faster disk of a pair of disks is currently performing error recovery and the slower disk is not currently performing error recovery, read function 170 selects the slower disk of the pair of disks in step 345.

Figure 4:
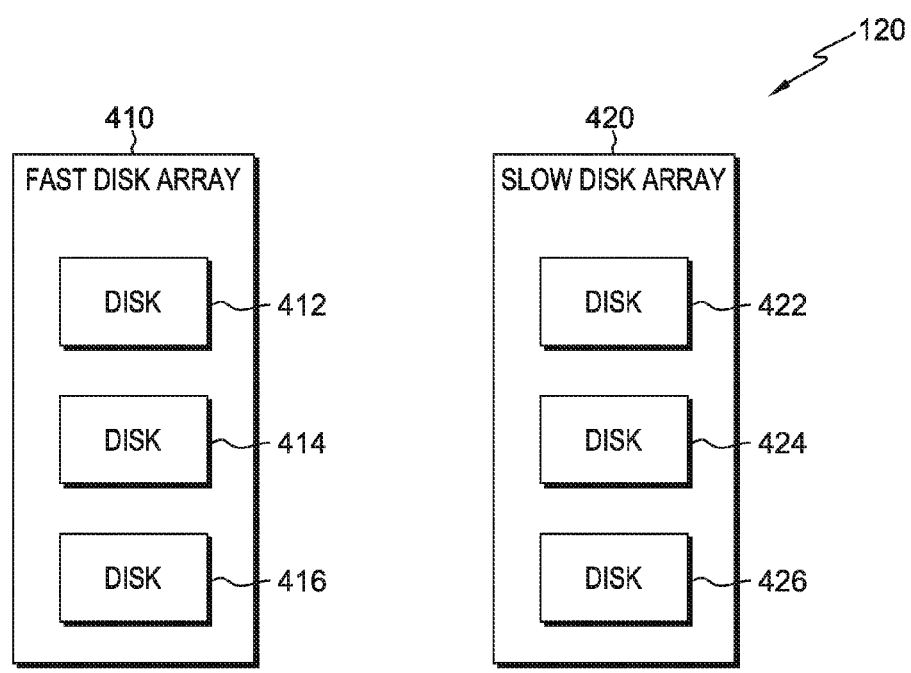
FIG. 4 is a block diagram of the components of the storage device array within the data processing environment of FIG. 1, in accordance with an embodiment of the present invention.

FIG. 4 is a block diagram of the components of storage device array 120, in accordance with an embodiment of the present invention. Storage device array 120 contains fast disk array 410 and slow disk array 420. Fast disk array 410 contains disks 412, 414, and 416. Slow disk array 420 contains disks 422, 424, and 426. While in the depicted embodiment storage device array 120 contains a total of six disks grouped into fast disk array 410 and slow disk array 420, it should be appreciated by one skilled in the art that storage device array 120 can contain any number of disks divided into fast disk array 410 and slow disk array 420 in various embodiments of the invention.

In the depicted embodiment the six disks included in storage device array 120 have been divided into fast disk array 410 and slow disk array 420. The process of dividing disks into a fast disk array and a slow disk array includes ranking all of the disks according to their intrinsic performances and dividing the faster half of disks into fast disk array 410 and the slower half of disks into slow disk array 420. The intrinsic performance of a disk is determined by testing a disk to measure its intrinsic read and write speeds. Testing occurs while no other read or write operations are being executed by the disk except for the test of the intrinsic read and write speeds. In some embodiments testing a disk to determine its intrinsic read and write speeds involves recording the average amount of time required for the disk to read or write a single 4 KB block of data. In other embodiments, testing a disk to determine its intrinsic read and write speeds involves recording the average rate at which the disk reads or writes data, such as KB/s, MB/s, or GB/s. A disk's read and write speeds are tested when no other processes or I/O operations are occurring on the disk such as error correction, other read or write tasks, or any other operation which affects the measured performance of the disk. In an embodiment where storage device array 120 is newly formed and the disks in storage device array 120 have not yet been grouped into fast disk array 410 and slow disk array 420, each of the disks within storage device array 120 are tested immediately upon being installed into storage device array 120 and are ranked according to their recorded performance. Once all the disk are ranked, the faster 50% of the disks are grouped into fast disk array 410 and the slower 50% of the disks are grouped into slow disk array 420. It is assumed that any embodiment of the invention where data is to be stored redundantly on two disks in storage device array 120 will include an even number of disks in storage device array 120, and that each disk in fast disk array 410 will have a disk of corresponding capacity in slow disk array 420.

In general, the disks in fast disk array 410 are used as the primary disks for write operations processed by write function 160 of primary disk selection program 150 while the disks in slow disk array 420 are used as the secondary disks for write operations processed by write function 160 of primary disk selection program 150. The primary disk for a read operation is determined based on the method depicted in the flowchart of FIG. 3 and can use a disk from either fast disk array 410 or slow disk array 420 as a primary disk. In the case of read function 170, a primary disk refers to a disk which the portion of data is to be read off of, while a secondary refers to a disk which serves temporarily as a backup copy of the data on the primary disk. The selection of a primary and secondary disk by read function 170 refers only to a single read operation, and the secondary disk for one read operation may be selected as the primary disk for a following read operation.

It is assumed that the physical operation of disks included in storage device array 120 are closely monitored, and that disks will be replaced or fixed in the event that a disk fails before a second disk can fail. Additionally, it should be appreciated that fast disk array 410 and slow disk array 420 are virtual groupings of storage devices in the depicted embodiment and do not include any physical division between the disks of fast disk array 410 and slow disk array 420. Dividing the disks in storage device array 120 into fast disk array 410 and slow disk array 420 does not include any physical modifications to storage device array 120 or any physical movement of the disks included in storage device array 120.

FIG. 5 depicts a block diagram of components of computing devices 110 and 140 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing devices 110 and 140 include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Primary disk selection program 150 and storage device array 120 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of network 130, computing device 110, and computing device 140. In these examples, communications unit 510 includes one or more network interface cards. Communications unit 510 may provide communications through the use of either or both physical and wireless communications links. Primary disk selection program 150, write function 160, and read function 170 may be downloaded to persistent storage 508 through communications unit 510.

I/O interface(s) 512 allows for input and output of data with other devices that may be connected to computing device 110 or 140. For example, I/O interface 512 may provide a connection to external device(s) 518 such as a keyboard, keypad, a touch screen, and/or some other suitable input device. External device(s) 518 can also include portable computer readable storage media such as, for example, thumb drives, portable optical or magnetic disks, and memory cards. Software and data used to practice embodiments of the present invention, e.g., Primary disk selection program 150, write function 160, and read function 170, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for selecting a disk in a multi-disk storage system to perform an operation, the computer program product comprising:
   one or more computer readable storage media and program instructions stored on the one or more computer readable storage media, the program instructions comprising:
   program instructions to receive a request to write a portion of data, redundantly, to at least two disks;
   program instructions to select a first disk to write the portion of data, wherein the first disk is included within a first set of disks, wherein program instructions to select the first disk comprise program instructions to select, randomly, the first disk;
   program instructions to select a second disk to write the portion of data, wherein the second disk is included within a second set of disks, wherein intrinsic read speeds and intrinsic write speeds associated with each disk of the first set of disks are slower than intrinsic read speeds and intrinsic write speeds associated with each disk of the second set of disks, and wherein program instructions to select the second disk comprise program instructions to select the second disk sequentially from the second set of disks based on disks of the second set of disks which are not performing a read or write operation at a time of selection of the second disk;
   program instructions to write the portion of data to both the first disk and the second disk;
   program instructions to determine an intrinsic read speed and an intrinsic write speed associated with the first disk and the second disk, wherein program instructions to determine the intrinsic read speed and the intrinsic write speed associated with the first disk comprise program instructions to test a read speed and a write speed of the first disk while no other operations are being executed by the first disk;
   program instructions to receive a request to read the portion of data, wherein the portion of data is stored redundantly on both the first disk and the second disk;
   program instructions to identify a first latency associated with reading the portion of data from the first disk, wherein the first latency is based on at least the intrinsic read speed and the intrinsic write speed associated with the first disk, wherein the first latency comprises a first expected amount of time required to complete one or more operations currently in a first queue for execution on the first disk based wherein the first queue comprises a write operations queue and a read operations queue, wherein the first latency comprises a first expected amount of time required to complete one or more operations currently in a first queue for execution on the first disk based, at least in part, on the operations currently in the first queue for the first disk and the intrinsic speed at which the first disk performs read and write operations, and wherein program instructions to identify the first latency comprise:
      program instructions to compute a read latency for the first disk by dividing a total amount of data included in the read operations queue, present in the first queue for the first disk, by the intrinsic read speed associated with the first disk;
      program instructions to compute a write latency for the first disk by dividing a total amount of data included in the write operations queue, present in the first queue for the first disk, by the intrinsic write speed associated with the first disk; and
      program instructions to compute the first latency, wherein program instructions to compute the first latency comprise program instructions to add the read latency for the first disk and the write latency for the first disk;
   program instructions to identify a second latency associated with reading the portion of data from the second disk, wherein the second latency is based on at least the intrinsic read speed and the intrinsic write speed associated with the second disk, and wherein the second latency comprises a second expected amount of time required to complete one or more operations currently in a second queue for execution on the second disk based, at least in part, on the operations currently in the second queue for the second disk and the intrinsic speed at which the second disk performs read and write operations;

program instructions to determine that the first latency exceeds the second latency; and program instructions to select the second disk to read the portion of data.

\* \* \* \* \*